United States Patent
Airheart

[15] 3,690,413
[45] Sept. 12, 1972

[54] MOTION DAMPER
[72] Inventor: Franklin B. Airheart, Granada Hills, Calif.
[73] Assignee: Airheart Products, Inc., Sylmar, Calif.
[22] Filed: Oct. 5, 1970
[21] Appl. No.: 77,942

[52] U.S. Cl. .................. 188/1 B, 188/67, 188/105, 244/17.27
[51] Int. Cl. ............................................. F16f 7/08
[58] Field of Search ........... 188/1 B, 65.1, 65.2, 65.3, 188/67, 105; 244/17.27; 297/386

[56] References Cited

UNITED STATES PATENTS

| | | |
|---|---|---|
| 2,494,985 | 1/1950 | Campbell ............... 188/1 B X |
| 2,771,128 | 11/1956 | Doolittle ............... 188/1 B UX |
| 2,934,175 | 4/1960 | Schnitzer ............... 188/1 B X |
| 2,964,272 | 12/1960 | Olson .................... 188/1 B |
| 3,497,164 | 2/1970 | Horak .................... 188/1 B X |

Primary Examiner—Duane A. Reger
Attorney—White, Haefliger and Bachand

[57] ABSTRACT

A two-stage motion damper comprises:

(a) a member movable in opposite directions, (b) friction means engaging a side of said member to develop damping force restraining said movement, (c) yieldable means transmitting force urging said friction means into engagement with said member, and (d) a fluid pressure responsive actuator operable at selected times to develop additional force acting to urge said friction means relatively into engagement with said member.

10 Claims, 2 Drawing Figures

PATENTED SEP 12 1972 3,690,413
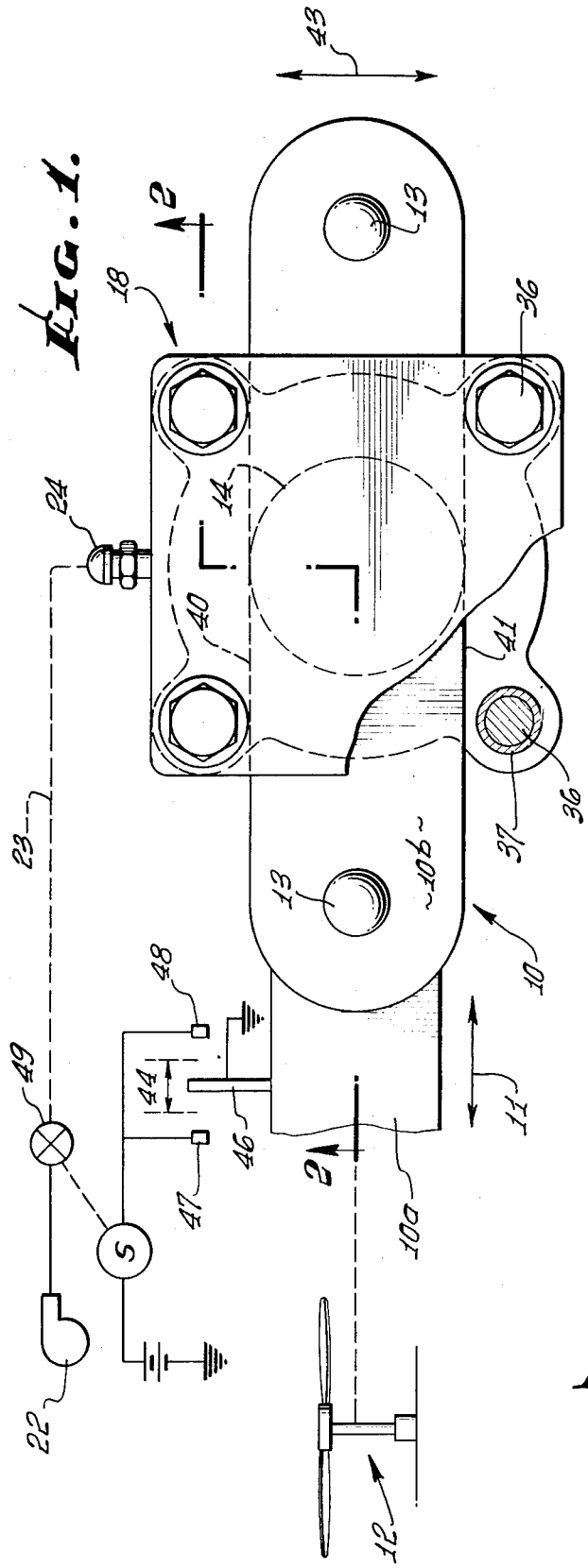
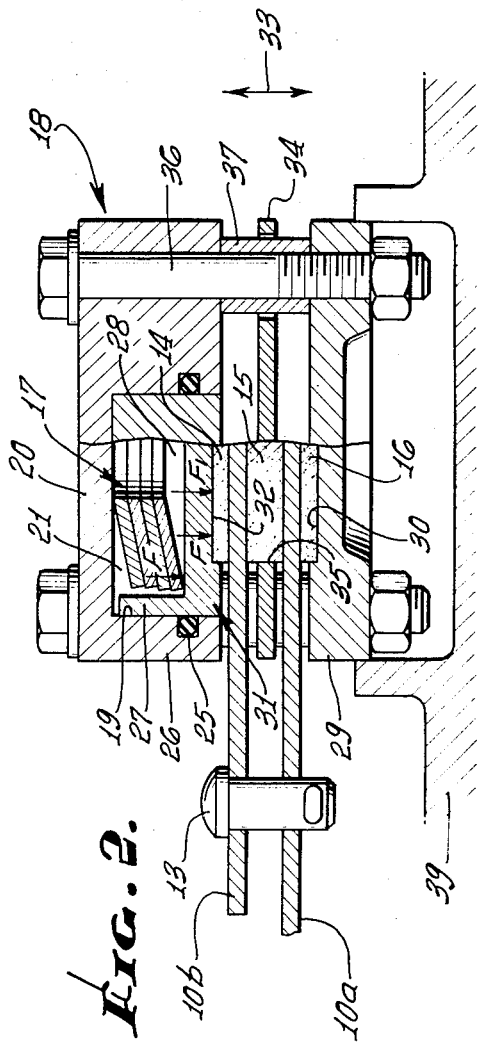
INVENTOR.
FRANKLIN B. AIRHEART
By White, Haefliger & Bachand
ATTORNEYS.

MOTION DAMPER

BACKGROUND OF THE INVENTION

This invention relates generally to motion dampers, and more particularly concerns an improved damper wherein damping force is applied in distinct stages.

When a member is subjected to oscillatory motion, it is oftentimes desired to damp such motion, as by application of braking force through a friction pad or pads. Where space limitations distate the confinement of the damper within a very small space, the problem of providing effective damping by means of a compact apparatus is presented. This problem is made acute by the requirement that the damper have multiple stages of force application to compensate for extreme excursions of the member to be damped, as may for example occur in helicopter rotor damping applications.

SUMMARY OF THE INVENTION

It is a major object of the invention to provide a solution to the above as well as other problems occurring in damper applications. Basically, the invention embodies a combination that includes: A member movable in opposite directions, and to be damped; friction means engaging a side of that member to develop damping force restraining such movement; yieldable means transmitting force urging the friction means into engagement with the member; and, a fluid pressure responsive actuator operable at selected times to develop additional force acting to urge the friction means relatively into engagement with the member. Typically, the friction means may comprise at least two friction elements or pads, and the member may include spaced, parallel sections the opposite faces of which are engaged by the pads, in stacked relation. As a result, an extremely compact unit is formed.

More specifically, body structure may support one element or pad, the actuator may include a plunger supporting a second pad, and a third pad may project between the second to be urged by the second pad and plunger toward the first pad, therely to clamp the sections between the pads. A plate between the sections may floatably support the third pad to allow it to shift and compensate for unequal wear of its opposite faces, the plate connected to the body structure to itself float normal to the direction of member movement.

Additionally, the actuator may include a cylinder interfitting the plunger which may be located between the spring means and friction means; connectors may hold the cylinder and body structure in spaced relation at opposite sides of the member; and spacers on the connectors may guide or confine the member therebetweens. Also, means may be provided to be responsive to extreme motion of the member to effect increased fluid pressure transmission to the plunger.

These and other objects and advantages of the invention, as well as the details of an illustrative embodiment, will be more fully understood from the following description and drawings, in which:

DRAWING DESCRIPTION

FIG. 1 is a top plan view of a two stage damper embodying the invention; and

FIG. 2 is a section taken on line 2—2 of FIG. 1.

In the drawings, a member 10 is movable in opposite longitudinal directions as indicated at 11. Merely as illustrative, the member may move in response to oscillatory force application, as may be transmitted for example by lateral deflection of the helicopter rotor 12. The invention is especially useful in such environment; however, it is not to be understood as limited to same. The member may include spaced parallel sections 10a and 10b which may be interconnected as by pin connectors 13 as indicated to limit separation of the sections but not closing together thereof.

The damper also includes friction means engaging a side of the members to develop damping force restraining member movement. Such friction means may with unusual advantage, comprise at least two friction pads or elements engaging opposite faces of the member 10. As illustrated, there are three such elements 14, 15 and 16 which may consist of brake lining or similar material, elements 14 and 16 engaging the opposite outer faces of the sections 10a and 10b, and element 15 engaging the opposite inner faces of the sections, providing a stacked relationship for increased dampening force development.

Further, the damper includes yieldable means transmitting force F acting to urge the elements 14–16 into frictional engagement with the member sections 10a and 10b, thereby to damp the back and forth movement of the member 10. In this regard, the force developed by the yieldable means, as for example a stack of Belleville washers 17, is conceived as providing sufficient force F to adequately damp the member lateral motion within a predetermined small range of movement.

Upon an increase in such movement, beyond the limits of that range, additional force $F^1$ is developed, as will be described, to reduce the excursions of the member, as for example, to the original limited range. Such additional force is typically developed as by means of a fluid pressure responsive actuator generally designated at 18 in the illustrated example. The actuator includes a plunger 31 confined within the bore 19 of actuator cylinder 20 at one side of the member 10, to slide in that bore in response to fluid pressure application to chamber 21 formed by the cylinder and plunger. Such pressure may be applied to that chamber from a pressure source 22, line 23 and fitting 24. An o-ring seal 25 seals off between the cylinder skirt 26 and the plunger skirt 27. The stack of Belleville washers is, with unusual advantage, confined in chamber 21, within a recess 28 formed by the plunger.

One of the friction means elements, as for example element 16, is supported by body structure 29 in the form of a plate which is recessed at 30 to partly receive the element 16. The actuator plunger 31 supports a second of the elements, as for example element 14, as by means of recess 32 formed in the plunger as shown to partly receive element 14. The third element 15 projecting between the sections 10a and 10b is connected with body plate 29 in such manner as to accommodate floating of that element in a lateral direction indicated by arrows 33. Such floating allows compensation for wear of the lining elements. The referred to connection may be provided by means including a plate 34 projecting longitudinally between sections 10a and 10b and having a through opening at 35 to receive element 15 to float relation to the plate to compensate for unequal wear of its opposite faces. The plate is in turn supported to float in the lateral direction as by connectors 36 attached to the body structure or plate 29, and also to the cylinder 20, holding the structure 29 and cylinder in assembled relation at opposite sides of the member sections 10a and 10b. Tubular spacers 37 hold the cylinder and plate 29 at required spacing and also retain the plate 34 to float laterally while being retained longitudinally. Accordingly, an extremely compact and effective assembly is provided to perform a large number of functions. Mounting structure 39 may suitably carry the damper unit. Pins 13 accomodate section 10b movement toward section 10a.

FIG. 1 indicates the projection of the member sections 10a and 10b between opposite pairs of connectors, opposite edges 40 and 41 of the sections being engagable with the tubular spacers or sleeves 37 acting as guides. Accordingly, the sections are blocked against lateral movement in the directions indicated by arrows 43 in FIG. 1.

In operation, oscillatory movement of sections 10a and 10b is fractionally damped in response to exertion of spring force F, at all times, the damping being such as to limit the amplitude of such motion to a small range, as for example is indicated at 44 in FIG. 1. Should that motion exceed the predetermined range, the fluid pressure in chamber 21 is increased to produce additional clamping force $F^1$, as described, thereby to reduce the member motion to transmit increased fluid pressure to the actuator 18. For example, a contact arm 46 on member 10a may engage either of contacts 47 and 48— operable to complete a circuit through solenoid S to operate a valve 49 in a direction to increase fluid pressure transmission from the pump 22 to the actuator. A delay may be built into the solenoid to keep it energized while the contact arm travels between contacts 47 and 48, but to drop out after arm 46 reduces its swing so as not to engage those contacts.

I claim:

1. In a two stage motion damper, the combination comprising
   a. a member movable in opposite directions,
   b. friction means engaging a side face of said member to develop damping force restraining said movement relative to the friction means and parallel to said face,
   c. yieldable means transmitting primary force urging said friction means into said engagement with said member side face, and
   d. a fluid pressure responsive actuator operable at selected times to develop additional force acting to urge said friction means relatively into engagement with said member, the actuator including a plunger through which said primary force is transmitted to said friction means.

2. The combination of claim 1 wherein said friction means comprises at least two friction elements engaging opposite faces of said member, said yieldable means comprising a stack of Belleville washers at one side of the plunger, one of the friction elements being carried at the opposite side thereof.

3. The combination of claim 1 wherein said member includes spaced, parallel sections, and said friction means comprises elements engaging opposite faces of each section.

4. In a two stage motion damper, the combination comprising
   a. a member movable in opposite directions,
   b. friction means engaging a side of said member to develop damping force restraining said movement,
   c. yieldable means transmitting force urging said friction means into engagement with said member, and
   d. a fluid pressure responsive actuator operable at selected times to develop additional force acting to urge said friction means relatively into engagement with said member,
   e. said member including spaced, parallel sections, and said friction means comprises elements engaging opposite faces of each section, there being body structure supporting one of said elements, the actuator including a plunger supporting a second of said elements, and a third of said elements projecting between said sections, and including means connecting said third element to said body structure to accommodate floating of said third element in a direction normal to said member movement.

5. The combination of claim 4 wherein said last named means includes a plate projecting between said sections and floatably supporting said third element, and a connector supporting said plate and attached to said body structure.

6. The combination of claim 4 wherein said actuator includes a cylinder telescopically fitting said plunger which is located between said yieldable means and said friction means.

7. The combination of claim 6 including connectors holding said body structure and cylinder in assembled relation at opposite sides of said sections, and said yieldable means being confined between said cylinder and said plunger.

8. The combination of claim 1 including means responsive to extreme motion of said member to effect transmission of increased fluid pressure to said actuator to develop said additional force.

9. The combination of claim 8 including a helicopter rotor connected with said member to transmit said movement thereto.

10. The combination of claim 7 including spacers on said connectors and between which said member is confined for said movement.

* * * * *